US010380469B2

(12) United States Patent
Troy et al.

(10) Patent No.: US 10,380,469 B2
(45) Date of Patent: Aug. 13, 2019

(54) METHOD FOR TRACKING A DEVICE IN A LANDMARK-BASED REFERENCE SYSTEM

(71) Applicant: The Boeing Company, Chicago, IL (US)

(72) Inventors: James J. Troy, Issaquah, WA (US); Christopher D. Esposito, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 233 days.

(21) Appl. No.: 15/207,678

(22) Filed: Jul. 12, 2016

(65) Prior Publication Data

US 2016/0321530 A1 Nov. 3, 2016

Related U.S. Application Data

(63) Continuation-in-part of application No. 13/552,445, filed on Jul. 18, 2012, now Pat. No. 9,448,758.

(51) Int. Cl.
*G06K 19/06* (2006.01)
*G06T 19/00* (2011.01)
(Continued)

(52) U.S. Cl.
CPC ....... *G06K 19/06037* (2013.01); *G06F 3/147* (2013.01); *G06F 3/1454* (2013.01);
(Continued)

(58) Field of Classification Search
None
See application file for complete search history.

(56) References Cited

U.S. PATENT DOCUMENTS 6,536,892 B1 * 3/2003 Chang .................. B41J 11/008
347/101
8,060,835 B2 11/2011 Newcomer et al.
(Continued)

FOREIGN PATENT DOCUMENTS

EP 2438880 A1 10/2010
JP H0886615 A 4/1996
WO 2011104167 A1 1/2011

OTHER PUBLICATIONS

Title: Theory and applications of marker-based augmented reality; Author: Sanni Siltanen; Date: Jan. 2012; Source: http://www.vtt.fi/inf/pdf/science/2012/S3.pdf.*

(Continued)

*Primary Examiner* — Jwalant Amin
(74) *Attorney, Agent, or Firm* — Ostrager Chong Flaherty & Broitman P.C.

(57) ABSTRACT

Systems and methods for determining locations of a device in an environment where features are present. Passive code pattern markers are used as unique location landmarks to provide on-demand location information to the user of the device in an abstract, landmark-based reference system that can then be mapped into an underlying physical 3-D coordinate system to give location coordinates that can be used by other tools to determine a viewpoint. For example, a 3-D visualization system can be configured to set a viewpoint so that an image concurrently generated by a computer system presents a scene which approximates the scene being viewed by the user in the physical world at that moment in time.

21 Claims, 7 Drawing Sheets

(51) Int. Cl.
*G06K 9/00* (2006.01)
*G06K 7/10* (2006.01)
*G06K 7/14* (2006.01)
*G06F 3/14* (2006.01)
*G06T 7/73* (2017.01)
*G06F 3/147* (2006.01)
*G06Q 10/02* (2012.01)
*G06Q 10/00* (2012.01)

(52) U.S. Cl.
CPC ....... *G06K 7/10881* (2013.01); *G06K 7/1417* (2013.01); *G06K 9/00624* (2013.01); *G06Q 10/02* (2013.01); *G06T 7/73* (2017.01); *G06T 19/006* (2013.01); *G06Q 10/20* (2013.01); *G06T 2207/10004* (2013.01); *G09G 2354/00* (2013.01); *G09G 2370/022* (2013.01); *G09G 2380/12* (2013.01)

(56) References Cited

U.S. PATENT DOCUMENTS

| | | |
|---|---|---|
| 2002/0052709 A1 | 5/2002 | Akatsuka et al. |
| 2002/0069001 A1 | 6/2002 | Sinex |
| 2005/0035980 A1* | 2/2005 | Lonsing ................ G06T 15/00 345/633 |
| 2007/0010923 A1 | 1/2007 | Rouyre |
| 2009/0030544 A1* | 1/2009 | Floeder ............... G01N 21/8851 700/122 |
| 2009/0086027 A1 | 4/2009 | Chaykin et al. |
| 2009/0086199 A1 | 4/2009 | Troy et al. |
| 2009/0319544 A1 | 12/2009 | Griffin et al. |
| 2010/0102980 A1* | 4/2010 | Troy ...................... G01C 15/00 340/686.6 |
| 2010/0135534 A1* | 6/2010 | Weston ................ G01B 11/007 382/106 |
| 2011/0096148 A1* | 4/2011 | Stratmann ................ G01J 5/02 348/46 |
| 2011/0268322 A1* | 11/2011 | Clausen ................ G01B 11/25 382/106 |
| 2012/0082383 A1 | 4/2012 | Kruglick |
| 2012/0130257 A1* | 5/2012 | Heanue ................ A61B 5/0059 600/476 |
| 2012/0218300 A1* | 8/2012 | Hayakawa ............. A63F 13/06 345/633 |
| 2012/0229842 A1 | 9/2012 | Groves |
| 2016/0189383 A1* | 6/2016 | Wang .................. G01B 11/002 348/135 |

OTHER PUBLICATIONS

English Abstract of JPH0886615A.

* cited by examiner

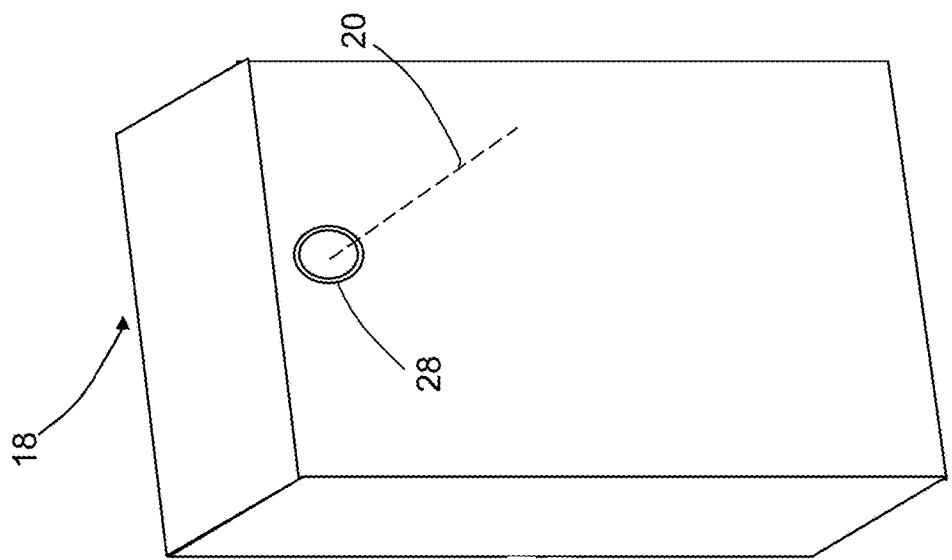
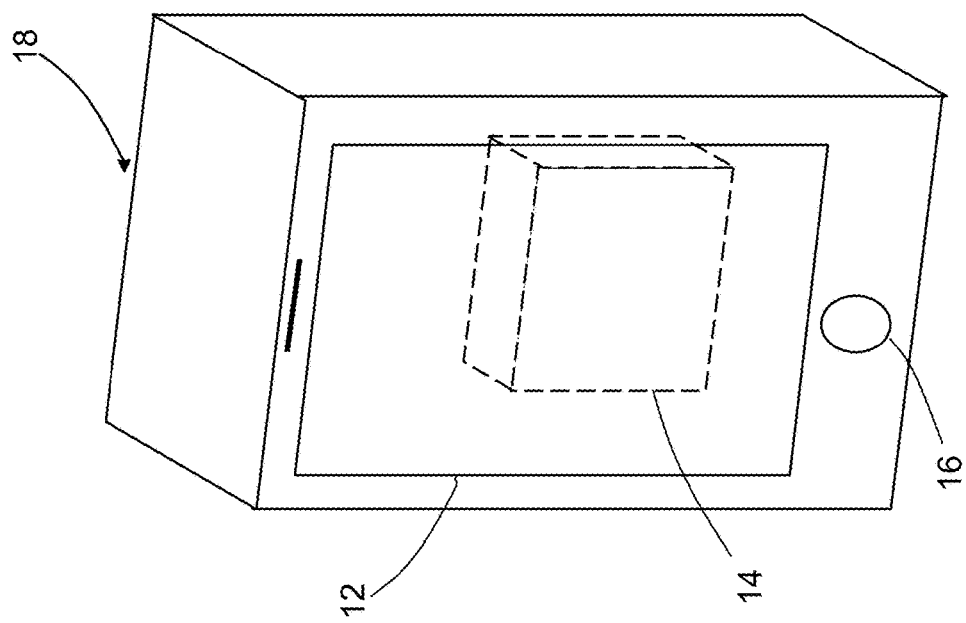

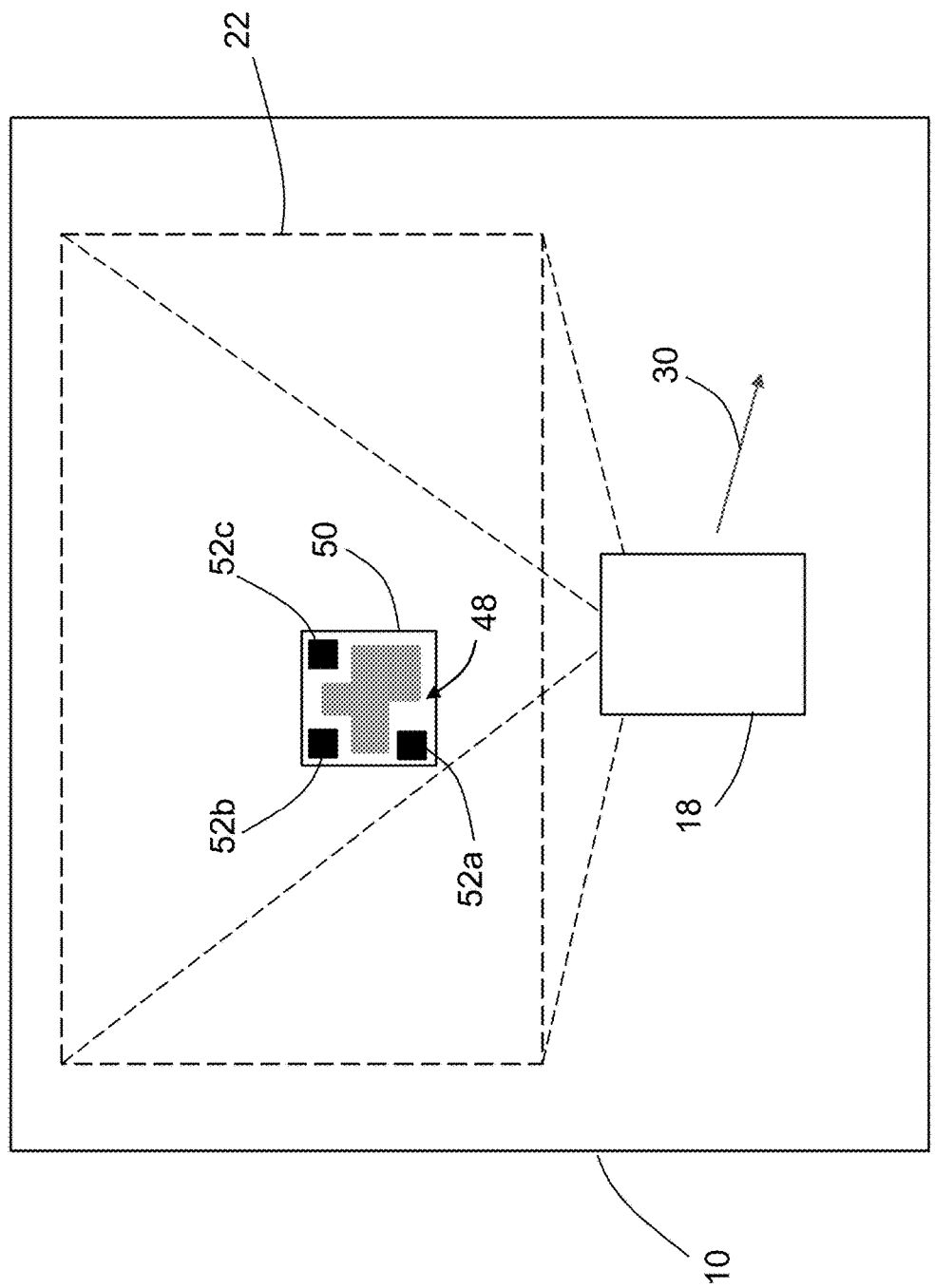

METHOD FOR TRACKING A DEVICE IN A LANDMARK-BASED REFERENCE SYSTEM

RELATED PATENT APPLICATION

This application is a continuation-in-part of and claims priority from U.S. patent application Ser. No. 13/552,445 filed on Jul. 18, 2012.

BACKGROUND

This disclosure generally relates to systems and methods for determining the location (i.e., position and orientation) of a user or device relative to a coordinate system of a target object. The target object may, for example, be an airplane or a building.

Determining the location of a user or device in the world has applications and benefits too many to list here, but in most situations this is limited to cases in which the user or device is located outdoors (i.e., not inside a structure) where technologies like GPS are available and relatively accurate. When the user or device is indoors (i.e., inside a structure), the problem becomes much more difficult because GPS may no longer provide accurate data, if it provides any data at all. A variety of other technologies (differential GPS, WiFi, RFID, laser) and approaches (triangulation, signal strength, time of flight) have been tried and all have usability issues, such as: the cost and time for instrumenting the environment can both be significant; signals may not be available everywhere; and the position estimates provided can be greatly degraded due to multipath distortion.

Motion capture tracking provides accurate location tracking, but requires the installation of multiple cameras in the environment. MEMS-based inertial measurement units (IMUs) have also been used for position and orientation tracking. IMU-based orientation tracking may work well, but position measurement using an IMU alone is not accurate due to drift issues. Some limited applications that use IMUs mounted to a shoe can give reasonable position data for walking applications—if the user is willing to wear the IMU on a shoe and deal with other idiosyncrasies.

Simultaneous localization and mapping (SLAM) methods use camera or laser-based devices to track features in an environment while moving. These methods can determine the position and orientation of the device relative to the environment, but they have trouble disambiguating objects in environments with repetitive features.

It would be advantageous to provide a system and a method for determining locations which can be used with three-dimensional (3-D) applications (such as 3-D visualization) for discrete or continuous real-time tracking of a device (e.g., a handheld imaging device being used by a person or by an automated system such as a robot) in situations that may contain repetitive features.

SUMMARY

The subject matter disclosed in detail below is directed to systems and methods in which a landmark-based reference system is mapped to a 3-D physical coordinate system defined for a specific target object. For the sake of clarity, the terms "physical coordinate system" and "landmark-based reference system" are defined as follows. There are four data scales: nominal, ordinal, interval and ratio. Their definitions are well established. The set of scales is itself ordered, with the next scale adding more attributes or constraints in addition to those of the previous scale. The nominal data scale refers to any set of data values that are distinct but unordered; the names of cars or schools or people are all examples of nominal data. An ordinal data scale refers to any set of values that have a natural ordering but the intervals between adjacent pairs of values need not be equal. A collection of numbered rows of seats with possibly varying spacing between rows (i.e., where the distance between row 1 and row 2 may not be the same as the distance between row 2 and row 3) is an example of ordinal data. The interval data scale refers to a set of data that is ordered and the intervals between adjacent pairs of values are equal. For example, the magnitude of the difference between 78 and 79 degrees Fahrenheit is the same as the magnitude of the difference between 29 and 30 degrees Fahrenheit. The ratio data scale refers to interval data with a meaningful zero point; an example would be the physical measurements of the distances between adjacent objects lined up in a row.

A coordinate system is a system that uses one or more coordinates to uniquely determine the location of a point in the space defined by the system. The data scale for a coordinate is at least ordinal, and the number of coordinates used in a given coordinate system defines the dimensionality of the space. The space may be abstract or physical. The most familiar example of a space is the 3-D physical world, but the scientific and mathematical literature has many examples of abstract non-physical spaces. As used herein, a "physical coordinate system" is one whose coordinates are ratio data scale and the space it defines is physical. As used herein, a "landmark-based reference system" is one whose coordinates are ordinal data scale and the space it defines may be abstract.

The subject matter disclosed in detail below is directed to systems and methods for determining locations of a device relative to a 3-D physical coordinate system of a target object, including but not limited to in an environment where repetitive features may be present. Passive markers are used as location landmarks to provide on-demand location information to the user in a landmark-based reference system that can then be mapped to the underlying 3-D physical coordinate system defined for the specific target object (e.g., an airplane). A mapping process to convert reference locations to physical location data (e.g., local Cartesian coordinates) is also disclosed below.

In accordance with the methods disclosed herein, the passive markers are in the form of attachable labels, such as adhesive-backed labels with printed text and a machine-readable data storage capability. The labels are applied to respective distinct locations on the target object (e.g., on the window at every row on an airplane, even if the labels are not at exactly the same place on each window).

The machine-readable data storage capability preferably takes the form of one- or two-dimensional code patterns. As used herein, the term "code pattern" means a machine-readable system of symbols representing data. In accordance with various embodiments, the code patterns comprise arrays of black geometric shapes, such as squares, rectangles, bars, circles or hexagons. Examples of suitable commercially available 2-D code patterns include the following: bar codes, Quick Response (QR) codes, Data Matrix codes, Aztec codes and MaxiCode.

The methods disclosed herein provide a way for users to quickly, easily and inexpensively instrument an environment with location landmarks (e.g., labels or markers with printed code patterns) that can be used later to give both discrete and continuous on-demand location tracking at a level of resolution dictated by the landmark spacing or density in the environment. The location landmarks are designed to be quickly and easily set up and later removed.

In accordance with the embodiments disclosed herein, the locations of the landmarks exist in a landmark-based reference system defined by the user in terms meaningful to the user (e.g., "left window at row 1", "forward lavatory", etc.). These locations can then be mapped into an underlying physical 3-D coordinate system that gives more exact x, y, z coordinates that can be used by other tools to determine a location of a handheld imaging device. For example, a 3-D visualization system can be configured to receive viewpoint information (e.g., a location of a virtual camera) from a handheld imaging device in relation to a plurality of landmarks having known coordinates in the frame of reference of the target object and, based on that user viewpoint information, set a viewpoint so that an image concurrently generated by a computer system (e.g., at an expert workstation) presents a scene which approximates the scene being viewed by the user in the physical world (e.g., inside an airplane) at that moment in time.

As used herein, the term "viewpoint" is the apparent distance and direction from which a camera views and records an object. A visualization system allows a user to view an image of a target object from a viewpoint that can be characterized as the apparent location of a virtual camera. As used herein, the term "location" includes both position (e.g., x, y, z coordinates) and orientation (e.g., look direction vector of a virtual line-of-sight).

One aspect of the subject matter disclosed in detail below is a method for locating a handheld imaging device in a frame of reference of a target object, comprising: (a) encoding a code pattern marker using symbology representing data identifying a feature of the target object; (b) associating the data identifying the feature to a coordinate position in the frame of reference of the target object to create a landmark-to-location map; (c) placing the code pattern marker at a location adjacent to a surface of the feature of the target object; (d) placing a handheld imaging device at a location separated from the code pattern marker by a distance; (e) after step (d), aiming the handheld imaging device to have a viewpoint wherein the code pattern marker is within a field-of-view of the handheld imaging device; (f) after step (e), operating the handheld imaging device to acquire image data representing an image of the code pattern marker; (g) processing the image data to decode the data identifying the feature of the target object; and (h) retrieving data representing the coordinate position of the feature of the target object from the landmark-to-location map using the data generated in step (g). In accordance with some embodiments, this method further comprises: setting an offset vector which is offset from a normal vector that is normal (perpendicular) to the surface of the feature of the target object; and setting a virtual viewpoint of an application based at least in part on the data retrieved in step (h) and the offset vector. In some applications, the look-at position is on the target object and the physical size of the landmark (code pattern label), along with a predetermined scale factor, can be used to determine the offset distance which can be used to compute the look-from position. In cases wherein the application is a visualization application, the method further comprises using the visualization application to generate an image of a scene showing a portion of a three-dimensional model representing a portion of the target object that includes the feature, wherein the virtual viewpoint approximates the viewpoint of the handheld imaging device. In accordance with one embodiment, the target object is an airplane and the feature is a window.

Another aspect of the subject matter disclosed in detail below is a method for locating a handheld imaging device in a frame of reference of a target object, comprising: (a) encoding a multiplicity of code pattern markers using symbology, each code pattern marker comprising respective symbology representing respective data identifying respective ones of a multiplicity of features of the target object; (b) associating the data identifying respective features of the multiplicity of features to respective coordinate positions in the frame of reference of the target object to create a landmark-to-location map; (c) placing each code pattern marker of the multiplicity of code pattern markers at a location adjacent to a surface of a respective feature of the multiplicity of features; (d) placing a handheld imaging device at a first location separated from a first code pattern marker of the multiplicity of code pattern markers by a first distance, the first code pattern marker being placed at a location adjacent to a surface of a first feature of the multiplicity of features; (e) after step (d), aiming the handheld imaging device to have a first viewpoint wherein the first code pattern marker is within a field-of-view of the handheld imaging device; (f) after step (e), operating the handheld imaging device to acquire first image data representing an image of the first code pattern marker; (g) processing the first image data to generate the data identifying the first feature of the target object; and (h) retrieving data representing the coordinate position of the first feature of the target object from the landmark-to-location map using the data generated in step (g). In accordance with some embodiments, this method further comprises: (i) setting a virtual viewpoint of an application based at least in part on the data retrieved in step (h).

The method described in the preceding paragraph may further comprise: (j) moving the handheld imaging device from the first location to a second location separated from a second code pattern marker of the multiplicity of code pattern markers by a second distance, the second code pattern marker being placed at a location adjacent to a surface of a second feature of the multiplicity of features; (k) after step (j), aiming the handheld imaging device to have a second viewpoint wherein the second code pattern marker is within the field-of-view of the handheld imaging device; (l) after step (k), operating the handheld imaging device to acquire second image data representing an image of the second code pattern marker; (m) processing the second image data to generate the data identifying the second feature of the target object; (n) retrieving data representing the coordinate position of the second repetitive feature of the target object from the landmark-to-location map using the data generated in step (m); and (o) setting a second virtual viewpoint of an application based at least in part on the data retrieved in step (n).

A further aspect of the subject matter disclosed in detail below is a system comprising: a target object comprising a multiplicity of features; a multiplicity of code pattern markers placed at respective locations adjacent to surfaces of respective features of the multiplicity of features, each code pattern marker comprising first, second and third registration fiducial symbols and respective symbology representing respective data identifying respective features of the multiplicity of features; and a handheld imaging device directed toward a portion of the target object, the handheld imaging device comprising: a nontransitory tangible computer-readable storage medium storing a mapping of the data identifying respective features of the multiplicity of features to respective coordinate positions in a frame of reference of the target object; and a processor configured to perform the following operations: (a) processing image data to generate data identifying a feature of the target object in a field-of-view of the handheld imaging device; and (b) retrieving data representing the coordinate position of the feature of the target object from the mapping using the data generated in operation (a).

In accordance with a primary use case, the processor of the handheld imaging device may be further configured to set a virtual viewpoint of a three-dimensional visualization application based at least in part on the data retrieved in operation (b). In alternative use cases, the handheld imaging device may be configured to communicate with a remote computer system via a wireless connection, which remote computer system is configured to set a virtual viewpoint of a three-dimensional visualization application based at least in part on the data retrieved in operation (b).

Other aspects of systems and methods for determining locations of a handheld imaging device in an environment where features are present are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

FIG. 1A is a diagram representing an isometric front view of a handheld imaging device which can be located using the methods disclosed herein.

FIG. 1B is a diagram representing an isometric rear view of the handheld imaging device depicted in FIG. 1A.

FIG. 2 is a diagram representing a schematic view of a field-of-view of a handheld imaging device projected onto a portion of a surface having a code pattern marker in the form of a label applied thereon.

Reference will hereinafter be made to the drawings in which similar elements in different drawings bear the same reference numerals.

DETAILED DESCRIPTION

Figure 3A:
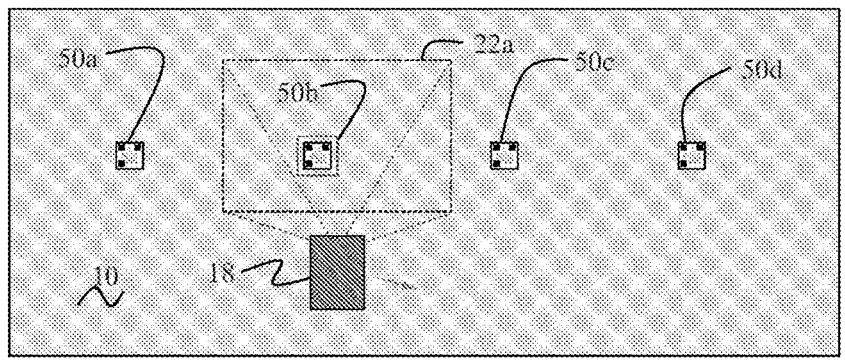
FIGS. 3A through 3C are diagrams representing respective schematic views of the field-of-view of a handheld imaging device projected onto respective areas of a surface having an array of code pattern markers applied thereon.

Illustrative embodiments of methods for determining locations in an environment where repetitive features are present are described in some detail below. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

For the purpose of illustration, methods for determining locations inside an airplane will be described in detail below. However, the concept of determining locations inside a target object using a plurality of code pattern markers and a handheld imaging device, such as a video camera or scanner, can also be used for target objects other than airplanes.

An airplane fuselage is one example of a structure or object on which the present embodiments may be used. Typically a fuselage is constructed using a detailed Computer Aided Design (CAD) database, which is a 3-D model of the structure in which items are defined with respect to a common Cartesian coordinate system. That coordinate system may then be applied as a reference coordinate system for determining the absolute position of any element of the structure contained in the CAD database. This CAD database is then maintained and available for reference in evaluations of ongoing inspection and maintenance of the airplane. The CAD database provides a coordinate system and exact geometrical information interrelated to that coordinate system associated with the entire structure and all components contained therein. As maintenance is performed, information regarding repairs or other maintenance procedures is stored with respect to this reference coordinate system in a maintenance and/or other database which is also keyed to the reference coordinate system. While a CAD database is employed for the example embodiments, any system which establishes a reference for absolute position to a common coordinate system may be employed.

An airplane has numerous features which may be associated to the same features in the CAD database. This one-to-one mapping (hereinafter "landmark-to-location map") between the physical positions of features on the real object and the Cartesian coordinates from measurements or the virtual model enables a process for tracking the motion of a handheld imaging device.

FIGS. 1A and 1B are isometric front and rear views of an exemplary handheld imaging device 18 which can be located using the methods disclosed herein. The handheld imaging device 18 may be an iOS device (such as an iPhone® or iPad® produced by Apple Inc., Cupertino, Calif.) or other "smart phone", tablet or other handheld computing device. In alternative embodiments, a hands-free device such as a head-mounted display (HMD) with integrated camera and processing can be employed. In accordance with the embodiment shown in FIGS. 1A and 1B, the handheld imaging device 18 comprises a display screen 12, a microprocessor 14 (indicated by dashed lines in FIG. 1A), a pushbutton 16 for activating image capture, and an integrated or attachable camera 28 having a line-of-sight 20 (indicated by a dashed line in FIG. 1B). In the alternative, image capture may be activated by pressing a virtual button which is displayed on display screen 12.

The handheld imaging device may also incorporate elements for providing a wireless communication capability. In particular, the handheld imaging device 18 may have on-board 3-D graphics abilities capable of running a 3-D visualization application or it may communicate wirelessly with a remote computer system running a 3-D visualization application (not shown in FIGS. 1A and 1B). Such wireless communication may be cellular, Wi-Fi or Internet-based with intermediary receivers and transmitters as required. The remote computer system has the ability to communicate with a 3-D model database.

In alternative embodiments, the handheld imaging device may contain sufficient memory and processing power for storage of the 3-D model database and operating information to enable 3-D visualization on display screen 12 of the scene being viewed by the camera 28, eliminating the need for communication with an external system.

FIG. 2 is a diagram representing a schematic view of a field-of-view 22 of a handheld imaging device 18 projected onto a portion of an interior surface 10 of a target object that has a rectangular code pattern marker 50 applied thereon. In accordance with the embodiment shown in FIG. 2, the code pattern marker 50 comprises a flexible substrate having a code pattern 50 printed thereon to form a landmark location for removable or semi-permanent placement on the interior surface 10 of the target object. The code pattern 50 includes three registration fiducial symbols 52a-52c located in respective corners of the code pattern marker 50. The registration fiducial symbols 52a-52c enable continuous relative location tracking. The flexible substrate of the code pattern marker 50 may comprise a sheet of paper, a film made of polymeric material, or other suitable printable flexible material. Alternatively, a portable ink jet printer (or similar device) could be used to print the code pattern 50 directly onto a substrate (not shown in the drawings) already applied to the surface 10 (e.g., the interior surface of a window in an airplane fuselage). The microprocessor 14 of the handheld imaging device 18 is configured to decode the code pattern 50 using code pattern decoder software. The handheld imaging device 18 is also configured to communicate with a remote computer system using radiofrequency signals 30.

For determination of the location (position and orientation) of the handheld imaging device 18 relative to the target object, acquisition of initial reference location information in an absolute coordinate system of the target object (such as airplane coordinates) is required. Establishing the relative location of the handheld imaging device 18 with respect to a surface 10 of the target object is accomplished through the use of an array of code pattern markers of the type depicted in FIG. 2. The relative tracking functionality enabled by the registration fiducial symbols 52a-52c in the code pattern 50 allows the distance and relative angle from the handheld imaging device 18 to be computed. The code pattern 50 is within the field-of-view 22 of the camera of handheld imaging device 18, and the data representing the unique landmark reference embedded in code pattern 50 will be the reference location used for subsequent motions. The relative tracking functionality enabled by the registration fiducial symbols 52a-52c in the code patterns allows the distance from the camera 28 (see FIG. 1B) of the handheld imaging device 18 and the relative angle of the line-of-sight 20 (see FIG. 1B) of camera 28 to be computed continuously as the handheld imaging device 18 is moved.

Figure 3B:
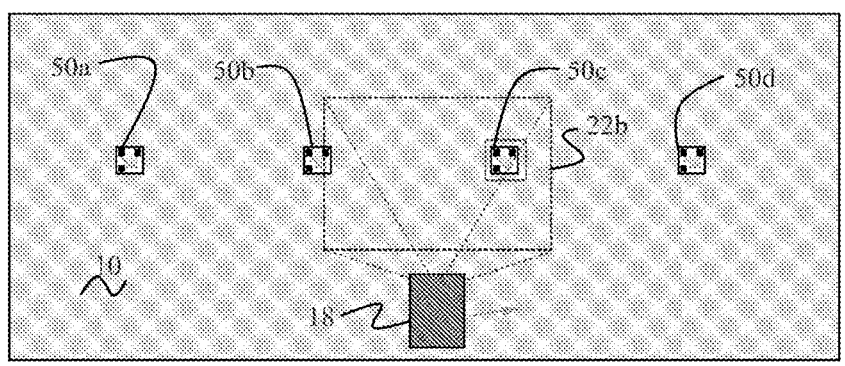
Figure 3C:
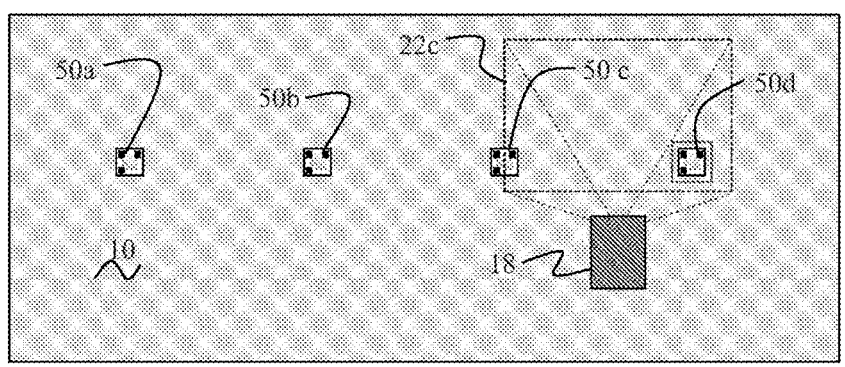

FIGS. 3A through 3C are diagrams representing respective schematic views of the field-of-view 22 of a handheld imaging device 18 projected onto respective areas of a surface 10 having an array of code patterns 50a-50d applied thereon. Each of these code patterns has three registration fiducial symbols at respective corners to enable continuous determination of changes in relative position and orientation of the handheld imaging device 18. Algorithms for position and orientation tracking and processing may be employed similar to those disclosed in ARToolKit supported by Human Interface Technology Laboratory (HIT Lab) at the University of Washington, HIT Lab NZ at the University of Canterbury, New Zealand, and ARToolworks, Inc., Seattle, Wash., and disclosed at http://www.hitl.washington.edu/artoolkit/ or similar position and orientation determination software. ARToolKit uses computer vision techniques to calculate the real camera position and orientation relative to code pattern markers. The camera of the handheld imaging device captures video of the target object. Software searches through each video frame for any square shapes. If a square is found, the software uses some mathematics to calculate the position of the camera relative to the black square. ARToolKit gives the position of the code pattern marker in the camera coordinate system. For the embodiments described herein, software routines employing these types of location tracking algorithms operate in the microprocessor 14 of the handheld imaging device 18 (see FIG. 1A).

The relative position and orientation of the three registration fiducial symbols 52a-52c (shown in FIG. 2) with respect to the handheld imaging device 18 provide data for determination of the camera pose relative to the surface 10 of the structure. The camera pose can be represented by a coordinate transformation matrix. This continuously updated relative localization information, along with unique reference location identification data contained within the data payload region of the code pattern read by the handheld imaging device 18, is used to provide continuous tracking in the absolute coordinate system of the structure (e.g., an airplane). This tracking functionality allows positioning at any location inside the structure so long as at least one code pattern remains within the field-of-view 22 of the handheld imaging device 18 and at a distance that can be resolved by the handheld imaging device 18. With the absolute position and orientation of the handheld imaging device 18 relative to the structure known, data from an on-board or off-board database associated with the location of interest can be retrieved. Data can be in multiple forms: text, icons, photographs, nondestructive inspection scans, video, and 3-D models, which can then be displayed on the display screen 12 of the handheld imaging device 18 (see FIG. 1A). In addition, the same scene can be presented on a display device associated with a remote computer system for concurrent viewing by an expert at an operations center.

Referring again to FIGS. 3A-3C, the use of multiple code patterns 50a-50d spaced along an interior surface 10 of a target object (such as an airplane fuselage) allows the field-of-view 22 of the handheld imaging device 18 to be moved along the target object with associated data from the corresponding 3-D model database on a display device being adjusted to reflect the changing location of the moving handheld imaging device 18. The code patterns 50a-50d can be placed with spacing on an interior surface 10 of the target object to form an array that allows at least one code pattern to be within the field-of-view 22 of the camera (not shown in FIGS. 3A-3C) as the handheld imaging device 18 is moved or panned along that interior surface 10. In an initial location of handheld imaging device 18 shown in FIG. 3A, the code pattern 50b is within the field-of-view 22a of the camera of the handheld imaging device 18. Based on the unique landmark reference information incorporated in the code pattern 50b, the tracking functionality disclosed herein is used to determine the relative location (i.e., position and orientation) of the handheld imaging device 18 with respect to the absolute coordinate system of the interior surface 10 of the target object. Thereafter, as handheld imaging device 18 is moved to a second location shown in FIG. 3B, code pattern 50c comes within the field-of-view 22b of the camera of the handheld imaging device 18, allowing continuous real-time update of the relative position and orientation of the handheld imaging device 18. Similarly, upon moving the handheld imaging device 18 to a third location shown in FIG. 3C, code pattern 50d comes within the field-of-view 22c of the camera of the handheld imaging device 18.

Figure 4:
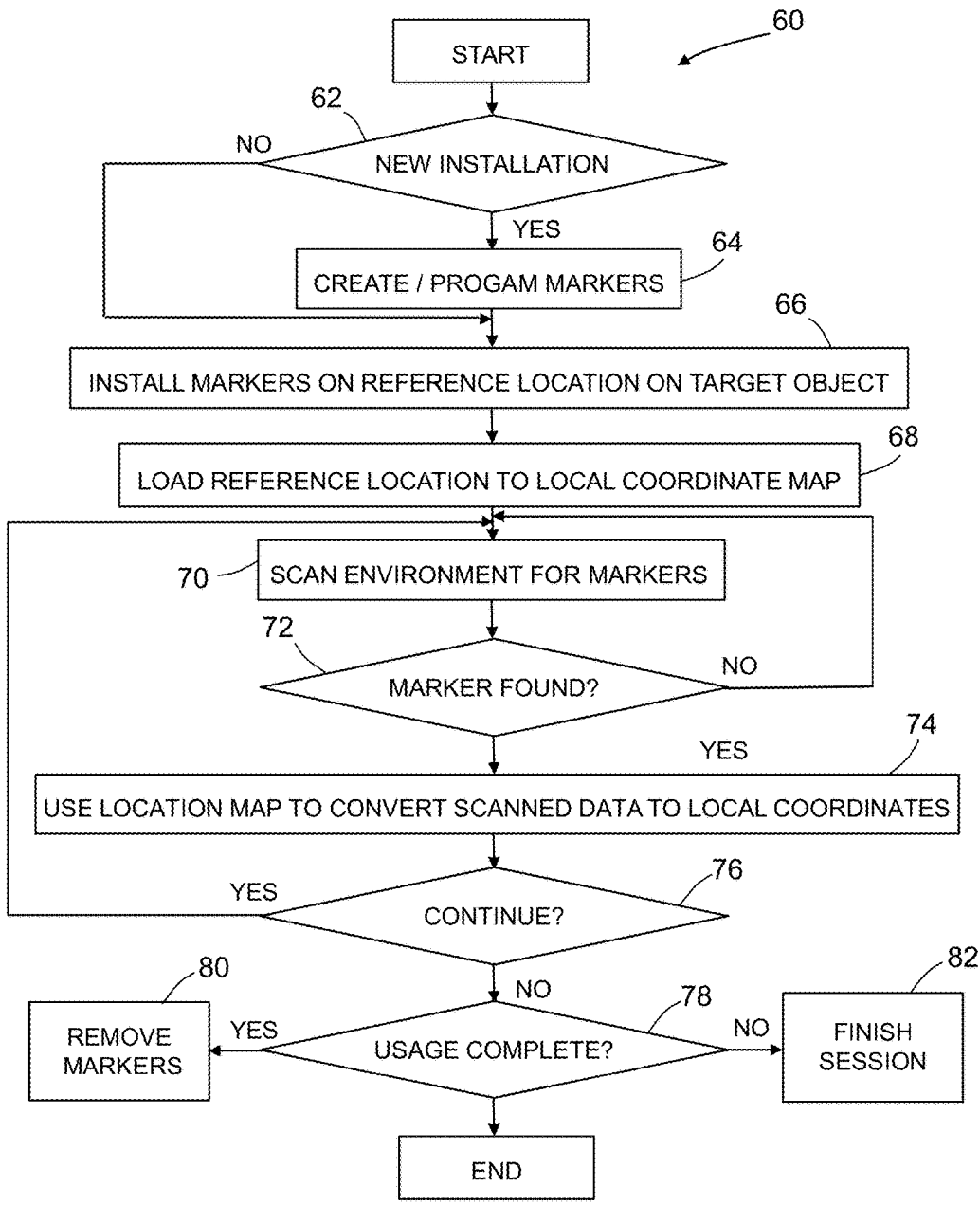
FIG. 4 is a flowchart identifying steps of a method for determining locations in an environment where repetitive features are present in a target object.

FIG. 4 is a flowchart identifying steps of a method 60 for determining locations in an environment where usable features, including repetitive features, are present on the target object. The process starts with a user determining whether unique code pattern markers associated with the repetitive features of interest have already been created (i.e., programmed) (step 62). If a set of unique code pattern markers does not yet exist (i.e., if the installation is new), then the user creates (i.e., programs) a set of unique code pattern markers and a landmark-to-location map (step 64), which code pattern markers are to be installed at respective reference locations on the target object. The payload in each code pattern marker contains a unique identifier for the respective reference location. After the code pattern markers have been created, the user installs them at the respective reference locations on the target object (step 66). Returning to step 62, if the user determines that a set of unique code pattern markers associated with the features of interest have already been created, then the user proceeds directly to step 66. Once the code pattern markers have been installed, the user loads the reference locations to a local coordinate map (step 68). This loading operation involves mapping the reference locations to respective sets of coordinates in the frame of reference of the target object, which establishes the locations of the code pattern markers in the frame of reference of the target object. After the reference locations have been mapped to the target object, the user scans the environment in search of code pattern markers using a handheld imaging device configured to read and decode the codes printed on the code pattern markers (step 70). The handheld imaging device may be a scanner, a web cam, a tablet computer with integrated camera, a smart phone with integrated camera, etc. During scanning, the user determines whether a marker has been found or not (step 72). If a code pattern marker is not found (i.e., if a code pattern marker is not within the field-of-view of the handheld imaging device), then the user continues to scan (step 70). If a code pattern marker is found in step 72, then the user uses the landmark-to-location map to convert the scanned and decoded data acquired from the code pattern marker to local coordinates of the target object (step 74). This location data can then be used by the application (such as for setting a virtual camera viewpoint in a 3-D visualization application). Thereafter the user determines whether data acquisition should continue or not (step 76). If data acquisition should continue, then the user returns to step 70. If data acquisition should not continue, the user determines whether overall usage of the code pattern markers on the target object is complete (step 78). If usage is not yet complete, the user finishes the session (step 82) and does not remove the code pattern markers from the target object. If usage is complete, the user removes the code pattern markers from the target object (step 80). Upon the performance of either one of steps 80 and 82, the process 60 comes to an end.

Figure 5:
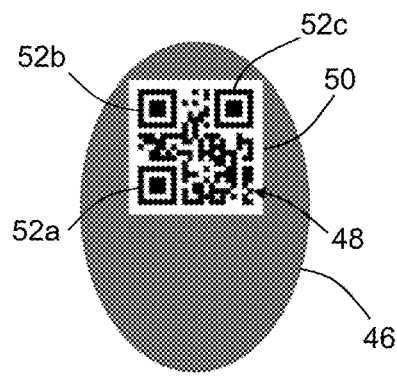
FIG. 5 is a diagram representing a QR code pattern marker adhered to a window inside a fuselage of an airplane.

One example of suitable commercially available code pattern are QR codes. QR codes are a type of 2-D barcode (a.k.a. matrix barcode) which have integrated registration fiducial symbols (a.k.a. registration marks). FIG. 5 is a diagram representing a QR code pattern marker 48 adhered to a window 46 inside a fuselage of an airplane. The QR code pattern marker 48 comprises a flexible substrate having a QR code pattern 50 printed thereon. The QR code pattern 50 comprises a payload consisting of data that identifies which window the QR code pattern marker 48 is adhered to. In addition, the QR code pattern comprises a registration fiducial symbol 52a in a lower left-hand corner of the code pattern, a registration fiducial symbol 52b in an upper left-hand corner of the code pattern, and a registration fiducial symbol 52c in an upper right-hand corner of the code pattern, which are used to track the location of the handheld imaging device (not shown in FIG. 5).

Figure 6:
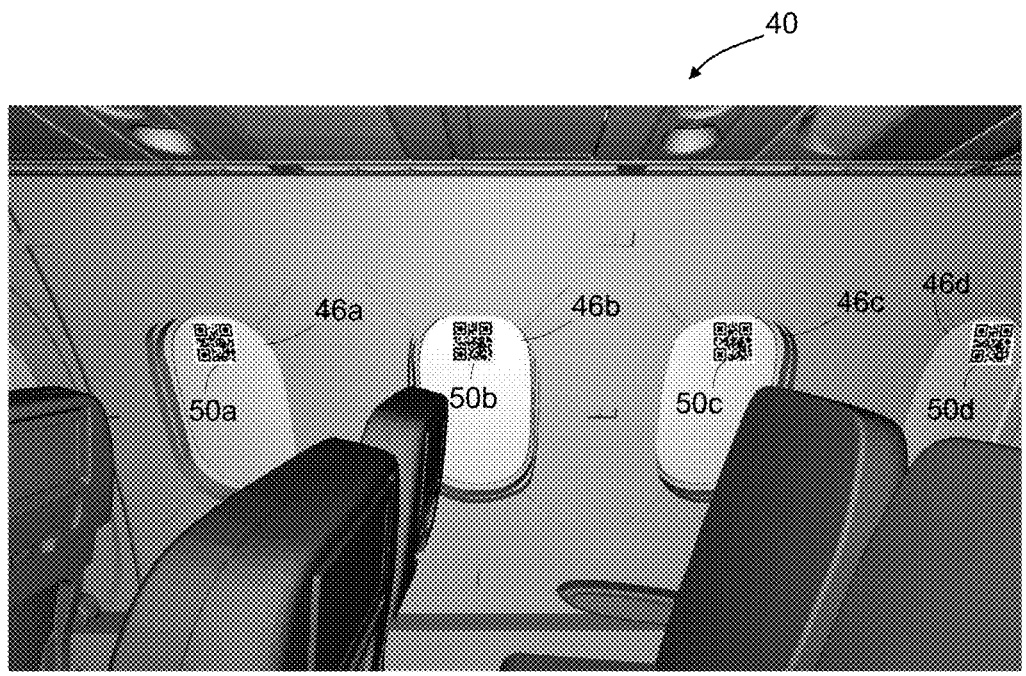
FIG. 6 is a diagram representing a 3-D visualization of the use of QR code pattern markers inside an airplane.

FIG. 6 is a diagram representing a 3-D visualization of the use of QR code pattern markers 50a-50d inside an airplane fuselage. (Code pattern markers on other windows are not shown.) Each of the QR code pattern markers 50a-50d comprises symbology that encodes respective unique reference location identification data identifying the reference location where the QR code pattern has been placed. In addition, each QR code pattern comprises a registration fiducial symbol in a lower left-hand corner of the code pattern, a registration fiducial symbol in an upper left-hand corner of the code pattern, and a registration fiducial symbol in an upper right-hand corner of the code pattern. In the scenario depicted in FIG. 6, QR code pattern marker 50a is applied in the center of the top portion of window 46a, QR code pattern marker 50b is applied in the center of the top portion of window 46b, QR code pattern marker 50c is applied in the center of the top portion of window 46c, and QR code pattern marker 50d is applied in the center of the top portion of window 46d. Each QR code pattern marker 50a-50d is unique. The payload in each QR code marker 50a-50d contains a unique identifier for a respective one of the windows 46a-46d. If desired, the QR code markers 50a-50d can be printed double-sided, so they are visible and usable from the exterior of the airplane. The text on each marker indicates which row's window that marker should be installed on. If each window is covered by a protective film, then the associated code pattern marker can be applied to the film, and will then be removed much later in the assembly process along with the film without significant risk of leaving foreign objects in the airplane.

The QR code patterns 46a-46d contain registration marks of known size and orientation, which permits a small amount of continuous relative position and orientation tracking when the QR code pattern marker is completely within the field-of-view of a handheld imaging device capable of continuous scanning (e.g., a video camera). If more than one QR code pattern marker is in the field-of-view of the camera, then it is possible to interpolate position between two QR code pattern markers, which enables continuous scanning over larger regions. The steps of scanning a QR code pattern marker and using the logical coordinates returned can be repeated as often as needed. Once this process is complete, the set of QR code pattern markers can be removed at that time, or they can be left onboard to be reused until the window protective films themselves are removed later in the assembly process.

In the embodiments disclosed above, QR code patterns are preferred because the registration marks are integrated into the format, and since QR code patterns are a standard type available in commercially available off-the-shelf products, which makes it more convenient for users to print the labels. However, alternative code patterns that do not have integrated registration marks may be employed. Data Matrix code, MaxiCode, Aztec code, and other types of 2-D barcode can be used if the continuous relative location tracking aspect of the concept is not needed or if it is a separate part of the label.

In accordance with alternative embodiments, a separate registration mark template (i.e., background image) can be added to a code pattern that lacks integrated registration marks. The code pattern can be placed within the blank space between the registration marks to provide equivalent continuous tracking functionality to what can be achieved using QR codes. Any source that supplies machine readable landmark-based reference data may be employed such as UPC standard barcodes, Data Matrix (ECC 200) 2-D matrix barcodes, or MaxiCode 2-D matrix barcodes (used by UPS, public domain). As with the QR code pattern example, these alternate forms of discrete data storage can be used along with relative motion tracking to provide continuous tracking in an absolute coordinate system.

Figure 7:
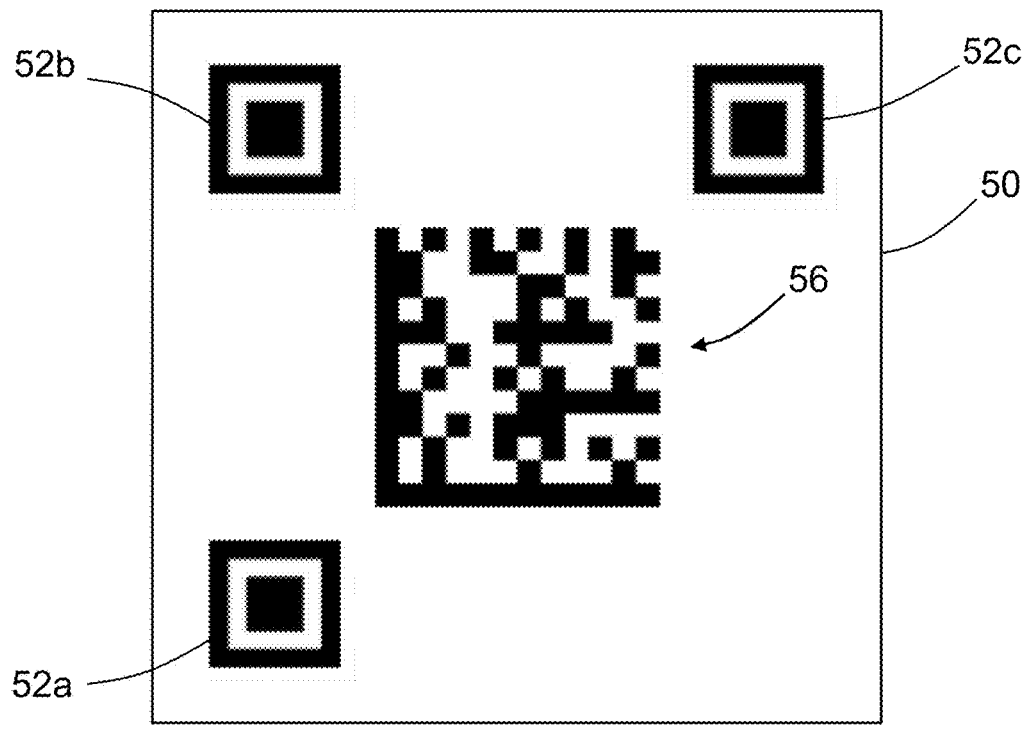
FIG. 7 is a diagram representing an example of a label having a Data Matrix code pattern and three registration fiducial symbols.

FIG. 7 is a diagram representing an example of a rectangular code pattern marker 50 having a Data Matrix code pattern 56 and three registration fiducial symbols 52a-52c at respective corners of code pattern marker 50. The registration fiducial symbols 52a-52c are located on the marker label, but are external to the Data Matrix part of the code pattern 56 and can be used for the continuous tracking aspect of the concept.

Once the QR code pattern markers have been installed, then the user can read each QR code pattern marker with a handheld imaging device configured to read and decode QR codes. The logical coordinates returned by the decoding now need to be mapped into the correct airplane coordinates, taking into account factors that include major and minor airplane model and applicable plug offsets. This landmark-to-location map is created once for each collection of factors needed and prior to first use on an applicable airplane.

Figure 8:
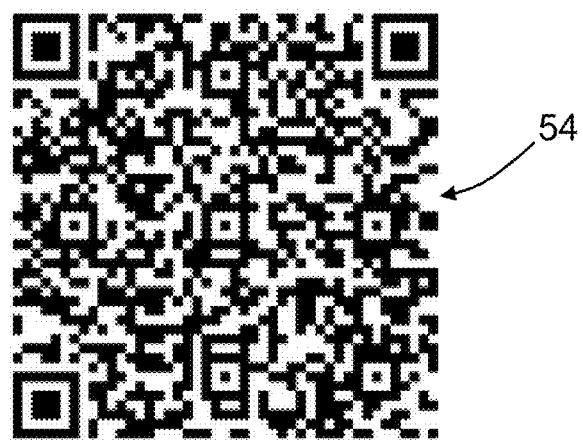
FIG. 8 is a diagram representing an example of a landmark-to-location map.

FIG. 8 is a diagram representing an example of a landmark-to-location map 54 incorporated in the payload of a QR code pattern. A marker having the landmark-to-location map 54 printed thereon can be placed anywhere on the target object or separate from it (including being portable). The landmark-to-location map 54 is used to retrieve the associated physical airplane coordinates in the airplane coordinate system. These physical airplane coordinates can then be fed into a 3-D visualization system to set that latter's virtual camera position and orientation so that the view displayed on a display screen closely approximates the physical view of the user inside the fuselage at the time the QR code pattern was read.

For the landmark-to-location map, the QR code registration symbols in respective corners of the marker are not important to the method and would be ignored when reading the map, since the landmark-to-location map is not used for continuous tracking while reading the map. If Data Matrix code patterns are used for the process instead of QR code patterns, the registration fiducial symbols 52a-52c shown in FIG. 7 would not need to be included in the marker for the landmark-to-location map.

The locations (in the airplane coordinate system) of the reference landmarks on the windows can be determined by measurement, such as using a 3-D coordinate measurement instrument (e.g., a laser tracker or local positioning system), or they can be determined from 3-D model data. The second form is easier if a 3-D model of the airplane is available. For each code pattern marker, the logical coordinates are associated with corresponding physical airplane coordinates. When all of the logical-physical coordinate pairings are complete, the full map can be created. More specifically, a listing in which the logical coordinates of each code pattern marker are associated with their corresponding physical airplane coordinates is stored in a nontransitory tangible computer-readable storage medium as a look-up table. In a typical use case, the 3-D model application that contains location data is a 3-D visualization application. Selection on the window model in the 3-D environment produces x, y, z position and surface normal direction data for the pick location. In other embodiments, the selection can be performed in a 2-D layout application—similar to what is on many airline and travel web sites that passengers use to select seats when purchasing a ticket. For this type of application, the x and y values come from the selection point and the z value as well as the surface normal are predetermined based on the x, y selection.

The measurement-based approach is useful when 3-D model data is not available. In this situation, the user would calibrate the 3-D coordinate measurement instrument (e.g., using a laser tracker) with known reference points in the environment. Then the user would begin the scan-to-measurement associating process. That process involves scanning the code pattern on the physical target object and then taking a measurement of that location with the 3-D coordinate measurement instrument. Surface normal data can be created from a cross-product of vectors from three non-collinear pick points on the target object. The scan and measurement data are stored associated together (paired) in the map table as described above.

In the absence of any other information, the user would not know exactly where on the 3-D model of the window he/she should select. But if there are other assumptions or constraints imposed on where the pick point should be, then the user will be able to get the proper location. For example, assume that the code pattern markers were always to be centered along the upper edge of each window. The person putting the code pattern marker on the window can easily find that on the physical window, and the person acquiring the location data from the 3-D model can easily find that same location on the virtual 3-D model of the window.

Alternatively, even if the person putting the code pattern markers on the windows did so in a random way, the person acquiring the location data from the 3-D model can still do a reasonably good job of visually comparing the locations when making the 3-D point selection (probably to within an inch or so). If more precision is needed, they can use a ruler to measure the distance of the code pattern marker from the window frame.

For a typical use case, the location information would be a position (i.e., x, y, z coordinates) and a direction vector associated with the surface normal of the target object. For the airplane windows embodiment, the normal points inward toward the aisle and by knowing the normal, one can compute a reasonable offset vector for where the virtual camera should be located. In one method, the offset vector can be determined based in part on the size of the code pattern and a predetermined scaling factor. Other approaches may use constant distance or a rules-based approach to set the offset.

The viewpoint definition can be determined from the x, y, z position of the virtual camera and a look direction. There are two common forms using the look-from and direction vector approach: (1) a look-from position (x, y, z) along with a look direction vector (i, j, k); and (2) a look-from position (x1, y1, z1) along with a look-at position (x2, y2, z2) (method 2 can be converted into method 1 with vector operations.)

In embodiments where the code pattern marker is the look-at point, a direction vector can be associated with the code pattern marker (in some cases this will be the surface normal of the target object; in other cases it could be a different vector chosen by the person creating the setup). In order to produce the required look-from point (method 2), one would need to use the direction vector multiplied by a scalar value that defines a reasonable distance to the target object—which gives the look-from position.

The aforementioned "reasonable offset vector" also entails a reasonable distance. The meaning of "reasonable distance" is context specific. For example, the person setting up the system may decide that the distance should place the default location for the virtual camera in the aisle adjacent the window. Or that person could decide that the default location for the virtual camera should be in the middle of the first, second or third seat. This distance value might be different if the seats were first class seats or coach seats, etc.

The landmark-to-location map can be acquired by the user in several ways. One approach is to get it from a database; for an airplane this could be specified by selecting the major/minor model numbers or the line number from an application menu. Another approach is to scan a code pattern marker (e.g., a QR code pattern marker) that contains the identifying information required to select a map (major/minor model numbers or line number). Another approach is to embed the entire map into a code pattern marker that can be scanned by the user, as shown in FIG. 5. This has the added benefit of not needing to have database or network access to acquire the map data (which also allows it to work in areas without wireless coverage). For the approaches using a scan to access the map, the data could be embedded in the same code pattern markers that contain the reference information or it could be on a separate code pattern marker that is placed near one the other markers, or copies of it in several places.

The landmark-to-location map should be developed for the specific use case and will use the code pattern reference to compute a user/device location depending on a formula that is context specific. In the example mentioned above, the map may have been created to provide a location where it was decided (for that specific use case) that the distance to the look-from point should be in the aisle for that part of the airplane. In other use cases it may be a fixed distance, e.g., 12 inches, from the area of interest on the target object. This means that the user of the map needs to know details of the expected location. This constraint information can be stored in the map, and presented to the user as a text message for example.

Further, it is not necessary that the code pattern markers be placed precisely at the same location on each window. If a code pattern marker is placed with a different orientation, the code reader software can read it in any orientation. The code pattern marker is a machine-readable landmark, and the application uses the landmark-to-location map to actually produce the location information. In other words, the map is the authoritative element in this process—the physical orientation of the code pattern marker is not critical, but the data that it refers to in the map is (and does have orientation information).

The separation of the physical code pattern marker from the location data due to mapping is one factor that makes the process disclosed herein more error tolerant than similar processes that put the location data directly on the code pattern marker.

After a code pattern marker on a specific window has been scanned, the data identifying the specific window is converted into a 3-D coordinate position in the frame of reference of the airplane using the above-described mapping. A location of a virtual camera can then be determined (as described above) using the 3-D coordinate position information retrieved from the mapping and a specified vector offset along the vector normal to the target object at that 3-D coordinate position. That virtual camera location is then used to set the viewpoint to be adopted by a 3-D visualization application running on either the handheld imaging device (located inside the airplane) or on a separate remote computer system (located outside the airplane).

The 3-D model of the airplane is stored in a non-transitory tangible computer-readable storage medium which is accessible to the computer system that hosts the 3-D visualization application. The 3-D visualization application enables graphical representation of airplane components in their physical form. The 3-D application can be running on the handheld device or a remote computer system that is hosting the 3-D visualization application can be further configured to receive the 3-D coordinate position data from a handheld imaging device and convert that information to a string of data specifying the location of a virtual camera (i.e., specifying the viewpoint). This command message is sent to the 3-D visualization application, which uses it to display a scene of a portion of the airplane having the same viewpoint as that of the person holding the handheld imaging device inside the airplane.

A 3-D visualization application may be run on many different types of computer systems. As used in the claims, the term "computer system" should be construed broadly to encompass a digital data processing system having at least one computer or processor, and which may have multiple computers or processors that communicate through a network or bus or directly to each other. As used in the preceding sentence, the terms "computer" and "processor" both refer to devices comprising a processing unit (e.g., a central processing unit, an integrated circuit or an arithmetic logic unit). Examples of suitable computer systems include a smartphone, a tablet computer, a laptop computer, a desktop computer, a workstation computer, a smart watch, a head-mounted display or other wearable displays. The computer system may include at least two processors connected to each other, one of which is a graphics processor. In the alternative, it is common for high-end systems to have a central processing unit (CPU) as well as a graphics processing unit (GPU), but some systems, like lower-end computing systems or smartphones, may have a single processor with an embedded graphics processing chip (often referred to as "integrated" graphics), or even "software" rendering, which uses the CPU to render the images.

In accordance with some embodiments, the computer system comprises a graphics processor configured to perform the graphics function known as rendering. As used here, the term "rendering" is the process of generating an image from a 2-D or 3-D model by means of computer programs. The graphics processor described herein renders at least a portion of the 3-D model of a selected object in a window with a default or other existing viewpoint during running of a 3-D visualization application. In response to the input of a 3-D visualization activation command from the user, a separate processor that processes user inputs retrieves 3-D model data from a nontransitory tangible computer-readable storage medium and sends it to the graphics processor for rendering, i.e., the 3-D model data is processed and output to a digital image or raster graphics image file for display on a display device.

The computer system may be generally configured to execute one or more computer programs, including a 3-D visualization application configured to render for display a digital 3-D model of a structural product composed of a plurality of parts, such as a 3-D computer-aided design (CAD) or other similar model (sometimes referred to as a solid model). The 3-D visualization application may render the digital 3-D model in accordance with a number of techniques, such as those employed by CAD viewers and other 3-D visualization applications. These types of applications use a graphics application program interface, such as OpenGL or Direct3D, to render sequences of images representing the 3-D models contained within a virtual environment. Some examples include virtual reality modeling language (VRML) viewers, X3D viewers, Java 3-D viewers, QuickTime virtual reality (VR), QTVR, Unity, Unreal Engine or the like.

In one example, the 3-D model may represent the structural product as a collection of "primitives" such as edges, faces, points (e.g., vertices) and the like, which may be arranged into polygons or other arithmetically-derived structures to represent the geometry of surfaces, volumes or parts of the respective structural product. The structural product may be defined by a "boundary" representation, or collection of polygons that demarcate the space occupied by the structural product, which may include sub-collections of polygons that demarcate spaces occupied by respective parts of the structural product. Each of these sub-collections of polygons may be referred to as a 3-D object that corresponds to part of the structural product in the 3-D model. For some structural products, the 3-D model may use hundreds of thousands, millions or even billions of polygons, which may be arranged in thousands of sub-collections of polygons (3-D objects) corresponding to several thousands of parts.

The 3-D model may include information that indicates a design type of the airplane model, such as an art concept, preliminary design, released design or the like. The 3-D model may include information (e.g., name, number, quantity, source, material, location, related parts) regarding the structural product and/or one or more of its parts. The 3-D model may further include a model-based definition of the structural product, product manufacturing information such as geometric dimensions and tolerances, material specifications, component lists, process specifications, inspection requirements or the like. Additionally or alternatively, for example, the 3-D model may include information specifying various manufacturing, inspection, maintenance and/or repair procedures, each of which may include one or more tasks involving (user) interaction with one or more parts of the structural product. In various examples, this additional information may be provided directly in the 3-D model or in metadata associated with the 3-D model.

The 3-D visualization application is configured to render the digital 3-D model of the structural product in a scene in which the digital 3-D model (or portions thereof) is observed from a particular point of view (i.e., viewpoint) corresponding to a virtual camera location in the frame of reference of the airplane. The 3-D visualization application may open or otherwise initially render the 3-D model observed from a home virtual camera location (i.e., home viewpoint), such as a viewpoint in which the whole of the structural product is observed. The 3-D visualization application may then receive user input to navigate the 3-D model through a number of different operations such as pan, tilt and/or zoom operations, which may move the viewpoint of the 3-D model from its home to another viewpoint. In this manner, the scene may be focused on a particular portion of the airplane.

Although the process described above, involving placing code pattern markers on windows, is specific to airplane assembly, other applications with repetitive visible features in the environment are also potential candidates for this process.

Figure 9:
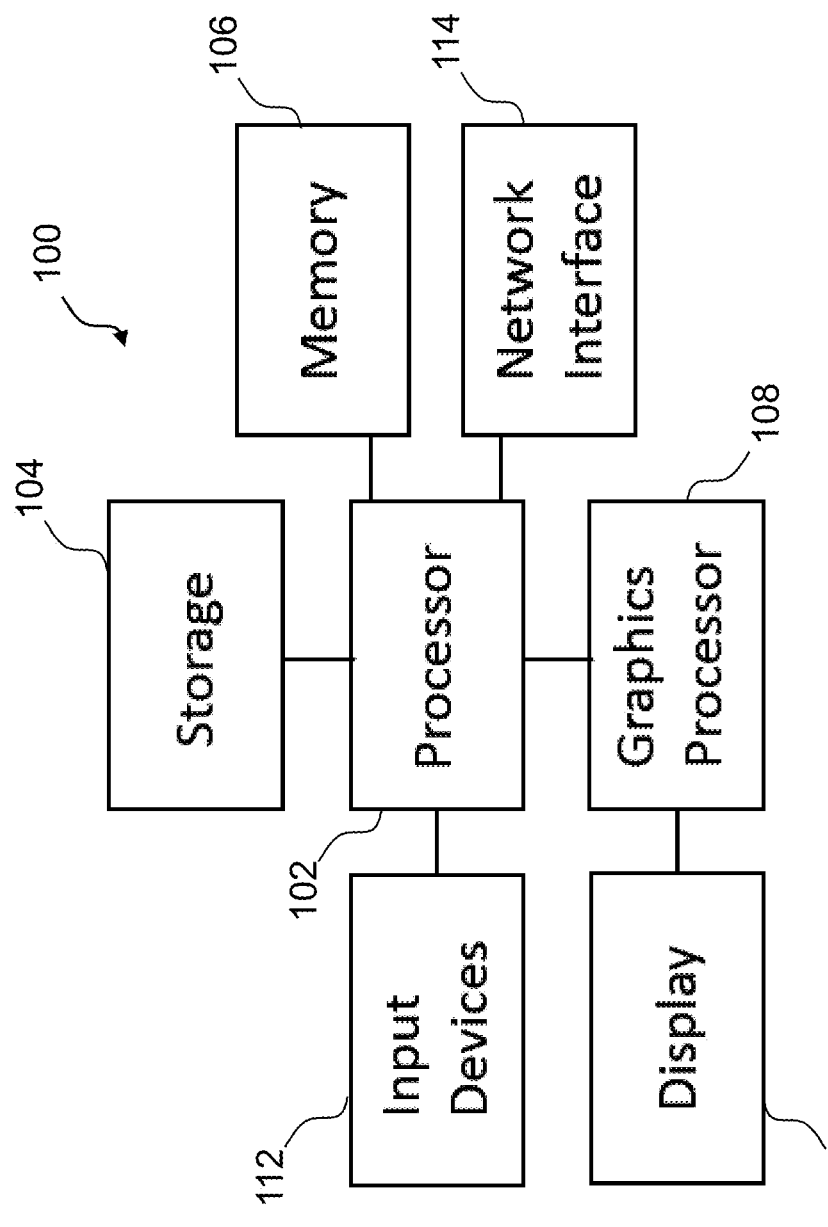
FIG. 9 is a block diagram identifying components of a system 100 suitable for hosting a 3-D visualization application, which system can communicate with handheld imaging devices.

FIG. 9 is a block diagram identifying components of a system 100 suitable for hosting a 3-D visualization application, which system can communicate with handheld imaging device of the types described above. The processor 102 is generally any piece of computer hardware that is capable of executing computer programs that process data (e.g., a 3-D visualization application). The processor 102 may comprise electronic circuits, some of which may be packaged as an integrated circuit (e.g., a chip) or multiple interconnected integrated circuits. The processor 102 may be configured to execute computer programs, which may be stored onboard the processor or otherwise stored in a memory 106 as computer-readable program code. In alternative embodiments, the processor 102 may be embodied as or otherwise include one or more application-specific integrated circuits, field-programmable gate arrays or the like.

The storage 104 is generally any piece of hardware that is capable of storing digital data and computer programs (e.g., computer-readable program code and 3-D model files) on a permanent basis. Such storage may take the form of a hard drive, a solid-state drive, an optical disk, a magnetic tape or some combination thereof.

The memory 106 is generally any piece of computer hardware that is capable of storing digital data and computer programs (e.g., computer-readable program code and a 3-D model file) on a temporary basis. The memory 106 may include volatile and non-volatile memory, and may be fixed or removable. Examples of suitable memory include random access memory, read-only memory, a hard drive, a flash memory, a thumb drive, an SD card, a removable computer diskette, an optical disk, or some combination thereof.

In various instances, the storage 104 and the memory 106 may be referred to as a tangible computer-readable storage medium. A tangible computer-readable storage medium is a non-transitory device capable of storing information, and is distinguishable from computer-readable transmission media such as electronic transitory signals capable of carrying information from one location to another.

The system 100 further comprises one or more input devices 112 (such as the handheld imaging device 18 depicted in FIGS. 1A and 1B). The input devices 112 may be wired or wireless, and may be configured to receive information from a user into the apparatus, such as for processing, storage and/or display. Examples of suitable user input devices include a mouse, microphone, image or video capture device, keyboard or keypad, joystick, touch-sensitive surface (separate from or integrated into a touchscreen), biometric sensor or the like.

In response to the input of a 3-D visualization activation command from the user via input devices 112, the processor 102 retrieves a file containing 3-D model data from the storage 104 and stores it temporarily in the memory 106. The processor 102 selectively processes the 3-D model data stored in memory 106 in accordance with other user inputs received via the input devices 112 and in accordance with instructions read from the 3-D visualization application software stored in memory 106.

In accordance with one implementation, the 3-D visualization application uses a graphics programming environment (like openGL) to instruct the processor 102 to load a 3-D model from storage 104. Sometimes the 3-D model data goes into the memory 106 and then is loaded into graphics memory (not shown) which is associated with or incorporated in a graphics processor 108, and on other occasions it may go directly into the graphics memory. The graphics processor 108 and associated graphics memory may be parts of an integrated graphic processing unit.

In addition to the storage 104 and 106, the processor 102 is connected to the graphics processor 108, which is in turn connected to a display device 110. The graphics processor 108 is configured to render for display digital 3-D models of a structural product composed of a plurality of parts and with respective viewpoints in response to receipt of coordinate transformation matrices from the processor 102. More specifically, the graphics processor 108 processes the 3-D model data and outputs pixel data to a digital image or raster graphics image file for display on a display device. In the alternative, it is common for high-end systems to have a central processing unit (CPU) as well as a graphics processing unit (GPU), but some systems, like lower-end computing systems or smartphones, may have a single processor with an embedded graphics processing chip (often referred to as "integrated" graphics), or even "software" rendering, which uses the CPU to render the images.

The processor 102 may also be connected to a network interface 114 for transmitting and/or receiving information, such as to and from other apparatus(es), network(s) or the like. The network interface 114 may be configured to transmit and/or receive information by physical (wired) and/or wireless communications links. Examples of suitable communication interfaces include a network interface controller (NIC), wireless NIC or the like.

The display device 110 may be configured to present or otherwise display information to a user. Suitable examples include a liquid crystal display, light-emitting diode display, plasma display panel or the like.

In summary, the tracking process in accordance with some embodiments comprises the following elements: (1) passive, code pattern markers applied to reference locations early in a build cycle; (2) an easy-to-access landmark-to-location map of reference locations to physical locations; (3) continuous or discrete scanning and interpretation of markers into the target object coordinate system; (4) the use of location data by a 3-D application that requires a viewpoint; and (5) removal and re-use or disposal of the passive code pattern markers.

The main difference between this approach and other tracking approaches is that it provides a low-cost method for location tracking without requiring extensive or intrusive preparation of the environment, and the process works in environments with or without repeating feature patterns. It is possible to reuse the code pattern markers, but they are cheap enough that they can be disposed of after a single use. The method also enables easy integration with 3-D visualization applications using existing hardware (tablet PCs, etc.).

This is a low-cost solution that is quick and easy to apply, and the text on the code pattern markers provides a check that the markers have been placed correctly. The code pattern markers do not obscure visibility of or hinder access to any other part. They are immune to the availability, cost, and accuracy issues outlined in the previous discussion of other solutions. If a code pattern marker is itself obscured, the degradation in the utility of this system is local, as the nearest visible code pattern markers can still be used.

The solution proposed herein does not take up space used for something else, or get covered over by other structure. It does not create additional foreign object debris, since window protective coverings will be removed as part of the existing process. Since the code pattern markers are in multiple locations, the process provides a reasonable level of redundancy, so even if some locations are temporarily blocked, the user (and application) can still see other targets in the environment.

Other companies with tasks involving working around complex systems like airplanes could benefit by using this application. In addition to aerospace companies, some other examples include: architectural applications—where temporary markers placed on doors or windows during construction can help workers determine locations more efficiently; warehouses—where manual or automated systems may need to determine current location relative to shelves; shipbuilding; and maintenance. The process is also applicable to smaller environments, like individual shelves or cabinets.

The concept presented here enables users of 3-D visualization applications to determine the location of a user or device on-board an airplane, and to a limited extent from outside of an airplane. It eliminates the need for external tracking systems for use cases that need discrete point-of-use location data.

Situations where location and part identification data is desirable are common in applications involving inspection, maintenance, and repair of airplanes. It is common in these situations for on-site non-expert personnel to communicate with an off-site expert analyst regarding a problem or concern. It is common practice for support personnel to take photographs of damaged locations. Based on these photographs, an on-site or off-site expert analyst may attempt to define where the damage is located by visually comparing the image of the damaged location with available technical data such as drawings, 3-D models, manual illustrations and similar documentation. This gives a subjective indication of the location reference of the damaged location relative to a target object. Based on this location, analysis is conducted with a high probability of location error. The processes of finding parts, identifying parts and information about parts at a given location, and recording information about a part (flaws or problems found at installation or inspection time) are all greatly improved in terms of time and accuracy by improved methods for determining user and part location on an airplane, which is what this process provides.

In accordance with an alternative embodiment, radiofrequency identification (RFID) tags can be used instead of optically detected code pattern markers. In this case, a dedicated RFID reader is attached to or integrated into a portable computing device used to read the RFID tags. If the optional continuous relative location tracking aspect of the concept disclosed herein is desired, then some other form of relative location tracking process would be required (since it is difficult to do that part with RFID alone). It is possible to use the same type of external registration marks as discussed above for the relative tracking process along with RFID. That would require optical hardware (e.g., a digital camera) as well as RFID hardware. For situations where continuous relative location tracking was not needed, RFID would be a reasonable alternative to camera-based solutions.

While this disclosure has focused mainly on airplane-related tasks, it is not limited to that specific field. Other manufacturing, architectural, and construction applications that use 3-D models could take advantage of this concept.

While systems and methods for determining the location of a user or device in an environment where repetitive features are present have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit, an integrated circuit or an arithmetic logic unit).

As used herein, the term "location" comprises position in a fixed three-dimensional coordinate system and orientation relative to that coordinate system.

The process claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A method for locating a handheld imaging device in a frame of reference of a target object, comprising:
   (a) encoding a multiplicity of code pattern markers using symbology representing data identifying respective repetitive features of the target object;
   (b) associating the data identifying the respective repetitive feature to respective coordinate positions in the frame of reference of the target object to create a landmark-to-location map;
   (c) after steps (a) and (b), placing the code pattern markers on the respective repetitive features of the target object;
   (d) placing a handheld imaging device at a location separated from one of the code pattern markers by a distance;
   (e) after step (d), aiming the handheld imaging device to have a viewpoint wherein the one code pattern marker is within a field-of-view of the handheld imaging device;
   (f) after step (e), operating the handheld imaging device to acquire image data representing an image of the one code pattern marker;
   (g) processing the image data to decode the data identifying the repetitive feature of the target object corresponding to the one code pattern marker; and
   (h) retrieving data representing the coordinate position of the repetitive feature of the target object corresponding to the one code pattern marker from the landmark-to-location map using the data generated in step (g).

2. The method as recited in claim 1, further comprising:
   (i) setting a virtual viewpoint of an application based at least in part on the data retrieved in step (h).

3. The method as recited in claim 2, further comprising setting an offset vector which is offset from a normal vector that is normal to the surface of the repetitive feature of the target object corresponding to the one code pattern marker, wherein the virtual viewpoint is set in step (i) based in part on the offset vector.

4. The method as recited in claim 3, wherein the application is a visualization application, further comprising using the visualization application to generate an image of a scene showing a portion of a three-dimensional model representing a portion of the target object that includes the repetitive feature of the target object corresponding to the one code pattern marker, wherein the virtual viewpoint approximates the viewpoint of the handheld imaging device.

5. The method as recited in claim 4, further comprising removing the code pattern marker from the location adjacent to the surface of the repetitive feature of the target object corresponding to the one code pattern marker after the image of the scene has been generated.

6. The method as recited in claim 4, further comprising transferring the data retrieved in step (h) from the handheld imaging device to a remote computer system via a wireless communication, wherein the computer system is configured to run the visualization application and generate the image of the scene on a display device.

7. The method as recited in claim 1, wherein step (a) comprises printing the symbology on a flexible substrate and step (c) comprises adhering the flexible substrate to the surface of the feature of the target object.

8. The method as recited in claim 1, wherein the target object is an airplane and the feature is a window.

9. A method for locating a handheld imaging device in a frame of reference of a target object, comprising:
   (a) encoding a multiplicity of code pattern markers using symbology, each code pattern marker comprising respective symbology representing respective data identifying respective ones of a multiplicity of repetitive features of the target object;
   (b) mapping the data identifying respective repetitive features of the multiplicity of repetitive features to respective coordinate positions in the frame of reference of the target object to create a landmark-to-location map;
   (c) after steps (a) and (b), placing each code pattern marker of the multiplicity of code pattern markers at a location adjacent to a surface of a respective repetitive feature of the multiplicity of repetitive features of the target object;
   (d) placing a handheld imaging device at a first location separated from a first code pattern marker of the multiplicity of code pattern markers by a first distance, the first code pattern marker being placed at a location adjacent to a surface of a first repetitive feature of the multiplicity of repetitive features;
   (e) after step (d), aiming the handheld imaging device to have a first viewpoint wherein the first code pattern marker is within a field-of-view of the handheld imaging device;
   (f) after step (e), operating the handheld imaging device to acquire first image data representing an image of the first code pattern marker;
   (g) processing the first image data to decode the data identifying the first repetitive feature of the target object; and
   (h) retrieving data representing the coordinate position of the first repetitive feature of the target object from the landmark-to-location map using the data generated in step (g).

10. The method as recited in claim 9, further comprising:
    (i) setting a first virtual viewpoint of an application based at least in part on the data retrieved in step (h).

11. The method as recited in claim 10, further comprising:
    (j) moving the handheld imaging device from the first location to a second location separated from a second code pattern marker of the multiplicity of code pattern markers by a second distance, the second code pattern marker being placed at a location adjacent to a surface of a second repetitive feature of the multiplicity of repetitive features;

(k) after step (j), aiming the handheld imaging device to have a second viewpoint wherein the second code pattern marker is within the field-of-view of the handheld imaging device;

(l) after step (k), operating the handheld imaging device to acquire second image data representing an image of the second code pattern marker;

(m) processing the second image data to decode the data identifying the second repetitive feature of the target object;

(n) retrieving data representing the coordinate position of the second repetitive feature of the target object from the landmark-to-location map using the data generated in step (m); and (o) setting a second virtual viewpoint of an application based at least in part on the data retrieved in step (n).

12. The method as recited in claim 10, further comprising setting an offset vector which is offset from a normal vector that is normal to the surface of the first repetitive feature of the target object, wherein the first virtual viewpoint is set in step (i) based in part on the offset vector.

13. The method as recited in claim 12, wherein the application is a visualization application, further comprising using the visualization application to generate an image of a scene showing a portion of a three-dimensional model representing a portion of the target object that includes the first repetitive feature, wherein the first virtual viewpoint approximates the first viewpoint of the handheld imaging device.

14. The method as recited in claim 13, further comprising removing the code pattern markers from the locations adjacent to the surfaces of the repetitive features of the target object.

15. The method as recited in claim 13, further comprising transferring the data retrieved in step (h) from the handheld imaging device to a remote computer system via a wireless communication, wherein the computer system is configured to run the visualization application and generate the image of the scene on a display device.

16. The method as recited in claim 9, wherein step (a) comprises printing the symbology on a flexible substrate and step (c) comprises adhering the flexible substrates to the surfaces of the repetitive features of the target object.

17. The method as recited in claim 9, wherein the target object is an airplane and the repetitive features are windows.

18. A system comprising:
a target object comprising a multiplicity of repetitive features; and
a multiplicity of code pattern markers placed at respective locations adjacent to surfaces of respective repetitive features of the multiplicity of repetitive features, each code pattern marker comprising first, second and third registration fiducial symbols and respective symbology representing respective data identifying respective repetitive features of the multiplicity of repetitive features.

19. The system as recited in claim 18, further comprising a handheld imaging device directed toward a portion of the target object, the handheld imaging device comprising:
a nontransitory tangible computer-readable storage medium storing a mapping of the data identifying respective repetitive features of the multiplicity of repetitive features to respective coordinate positions in a frame of reference of the target object; and
a processor configured to perform the following operations:
(a) processing image data to decode data identifying a repetitive feature of the multiplicity of repetitive features of the target object in a field-of-view of the handheld imaging device; and
(b) retrieving data representing the coordinate position of the repetitive feature of the target object from the mapping using the data generated in operation (a).

20. The system as recited in claim 19, further comprising a computer system configured to set a virtual viewpoint of a three-dimensional visualization application based at least in part on the data retrieved in operation (b).

21. The system as recited in claim 18, wherein the target object is an airplane and the repetitive features are windows.

* * * * *